(12) United States Patent
Albanesi

(10) Patent No.: US 8,517,134 B1
(45) Date of Patent: Aug. 27, 2013

(54) METHOD AND SYSTEM FOR ENGINE CONTROL

(76) Inventor: Daniel Albanesi, Columbus, NJ (US)

(*) Notice: Subject to any disclaimer, the term of this patent is extended or adjusted under 35 U.S.C. 154(b) by 1432 days.

(21) Appl. No.: 11/928,319

(22) Filed: Oct. 30, 2007

(51) Int. Cl.
*B60K 31/00* (2006.01)

(52) U.S. Cl.
USPC .............................. 180/170; 70/96

(58) Field of Classification Search
USPC ............... 180/170; 701/32, 53–54, 903–904, 701/70, 79, 85
See application file for complete search history.

(56) References Cited

U.S. PATENT DOCUMENTS

| | | | |
|---|---|---|---|
| 4,099,592 A | 7/1978 | Gonzales | |
| 4,337,511 A | 6/1982 | Schneider et al. | |
| 4,359,991 A | 11/1982 | Stumpp et al. | |
| 5,083,277 A | 1/1992 | Shutler | |
| 6,021,370 A | 2/2000 | Bellinger et al. | |
| 6,438,485 B1 | 8/2002 | Ries-Muller et al. | |
| 6,970,075 B2 | 11/2005 | Cherouny et al. | |
| 6,976,935 B2 * | 12/2005 | Boll et al. | 477/77 |
| 7,121,977 B2 | 10/2006 | Markyvech | |
| 7,141,001 B1 * | 11/2006 | Albanesi | 477/107 |
| 7,987,934 B2 * | 8/2011 | Huseman | 180/65.21 |
| 2002/0065598 A1 | 5/2002 | Denz et al. | |
| 2003/0216847 A1 | 11/2003 | Bellinger | |
| 2005/0221953 A1 | 10/2005 | Okabe et al. | |
| 2006/0011167 A1 | 1/2006 | Dolker | |

* cited by examiner

*Primary Examiner* — John Walters
*Assistant Examiner* — James Triggs
(74) *Attorney, Agent, or Firm* — Volpe and Koenig, P.C.

(57) ABSTRACT

A method for improved engine control is disclosed. The system controls the rate of change of engine RPM, referred to as "ramp rate." A method provides for controlling the ramp rate of an internal combustion engine including establishing a predetermined rate limit, determining a current engine speed, determining a desired engine speed, and adjusting the speed at or below the predetermined rate limit. In one embodiment, the ramp rate is controlled by an engine control module. The system does not require consideration of vehicle weight. Hence, there is no need for extensive sensors or other means to approximate a vehicle weight. This saves cost and complexity as compared with prior art systems. In another embodiment, the ramp rate control is based on a driver profile or user tier. This allows different ramp rates for different drivers, providing flexibility to have a lower ramp rate for less experienced drivers.

8 Claims, 5 Drawing Sheets

METHOD AND SYSTEM FOR ENGINE CONTROL

FIELD OF THE INVENTION

This invention pertains generally to internal combustion engines, and more specifically to a method and apparatus for controlling engine parameters in a way to improve fuel economy.

BACKGROUND

Vehicles, especially large cargo-carrying vehicles, such as tractor-trailers and buses, operate in a variety of load conditions, ranging from fully loaded, to empty. The horsepower required for moving the vehicle will vary depending on the load conditions. The way a driver operates a vehicle can also impact the fuel economy. For example, by gradually transitioning from a stopped state to a cruising speed, less fuel may be consumed than by rapidly accelerating from a stopped state. However, many drivers feel the pressure of time constraints, and the desire to minimize time spent on a delivery route will often outweigh the desire to maximize fuel economy.

Due to increasing cost of fuel, it is therefore desirable to provide a system that maximizes fuel economy, with minimal dependence on the driving techniques or actions of the vehicle operator. With any fuel economizing solution, it is equally desirable to avoid "over governing" of the engine to the point where driving is difficult or unsafe.

Electronic control modules for managing the operation of internal combustion engines are well known and widely used in the automotive and tractor truck industries. Such modules are typically operable to control engine fueling as well as many other engine and/or vehicle operating conditions. One technique known in the art is the control of the ramp rate, the rate of RPM increase (a.k.a. "ramp up") of a combustion engine. Ramp rate control is the subject of U.S. Pat. No. 7,121,977 to Markyvech which is incorporated herein by reference, to the extent consistent with the present disclosure. The aforementioned disclosure, while taking steps to address fuel economy, still has various shortcomings, such as high complexity, due to requiring various sensors and/or computer systems for performing vehicle weight estimation. Therefore, what is needed is an improved engine control system having reduced complexity.

SUMMARY OF THE INVENTION

With the ramp rate control systems in existence today, the ramp rate of an engine is increased to preprogrammed points based on the estimated gross weight of the vehicle. Depending on the driving conditions (e.g. road grade, wind, etc. . . . ), the preprogrammed point may not be optimal. The present invention addresses this by providing an engine control system that controls overall ramp rate as a percentage of the maximum ramp rate available.

In one embodiment of the present invention, an on board engine control module (ECM) is used to monitor and control the rate of RPM (revolutions per minute) increase (a.k.a. "ramp up") of a combustion engine. In one embodiment, there are no progressive limits, each gear is allowed to run to its maximum (red line) allowed value, but the rate at which the engine speed is allowed to increase is controlled as to have a similar start profile, regardless of the load, or incline of the vehicle.

The present invention does not require consideration of the weight of the vehicle. Hence, there is no need for extensive sensors or use of other means to approximate a vehicle weight. This saves cost and complexity as compared with prior art systems.

In another embodiment of the present invention, the present invention can provide the feature of a "programmable governor" to restrict the performance of a vehicle (e.g. for a teenager who just got a license). In one embodiment, the setting is adjustable via a code entered via an alphanumeric (or numeric) keypad on the vehicle. In another embodiment, it may be set via a computer terminal (e.g. via the OBDC-II port).

Another advantage of the present invention is that it accommodates both grades and flat roads with a simple solution that does not require speed monitoring, or monitoring of the load.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

In the drawings accompanying the description that follows, in some cases both reference numerals and legends (labels, text descriptions) may be used to identify elements. If legends are provided, they are intended merely as an aid to the reader, and should not in any way be interpreted as limiting.

DETAILED DESCRIPTION

In the control of combustion engines, the conventional practice utilizes an electronic engine control module (ECM) having volatile and nonvolatile memory, input and output driver circuitry, and a processor capable of executing a stored instruction set, to control the various functions of the engine and its associated systems. A particular electronic control unit communicates with numerous sensors, actuators, and other electronic control units necessary to control various functions, which may include various aspects of fuel delivery. Various embodiments of an engine control module (ECM) are known in the art. For example, U.S. Pat. Nos. 5,477,827, 5,937,826, and 6,135,918, incorporated herein by reference, each disclose an engine control module adaptable for use in the present invention.

Figure 1:
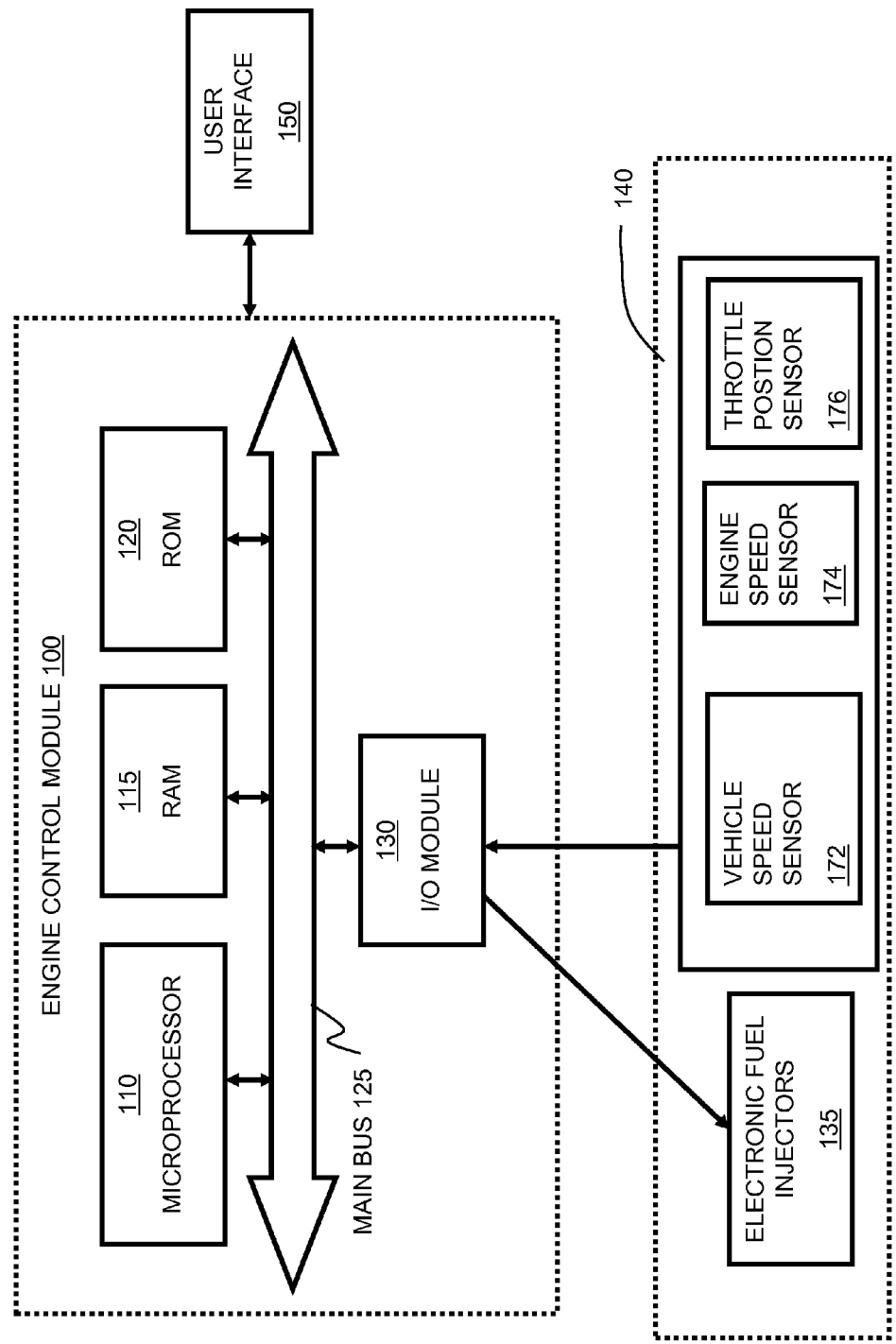
FIG. 1 shows a block diagram of a prior art engine control system on which the method of the present invention may be implemented.

For background purposes, an Engine Control Module known in the art will be briefly explained. Referring to FIG. 1, there is shown an engine control module (ECM). As shown, the ECM 100 includes a microprocessor 110 having data storage means such as random-access memory (RAM) 115, and nonvolatile read-only memory (ROM) 120. Of course, the ECM 100 may contain other types of memory instead of, or in addition to, RAM 115 and ROM 120, such as flash EPROM or EEPROM memories, as is well known in the art.

The ROM 120, or other nonvolatile memory, may contain instructions, which are executed to perform various control and information functions, as well as data tables, which contain calibration values and parameters characterizing normal engine operation. Microprocessor 110 imparts control signals to, and receives signals from, input and output (I/O) module 130. The I/O module 130 contains a plurality of analog and digital inputs and outputs. These inputs and outputs are in communication with the components of a vehicle engine. The ECM 100 detailed above is interconnected by data, address and control buses, indicated symbolically as the main bus 125. It should be noted that there are a variety of other possible control schemes which include various combinations of microprocessors and electric or electronic circuits which could perform the same function.

With continuing reference to FIG. 1, some of the components of an internal combustion engine system are shown. These include a plurality of electronic fuel injectors 135, each of which may be associated with a particular engine cylinder; and a plurality of sensors 140 for indicating various engine operating conditions. These sensors 140 include vehicle speed sensor 172, engine speed sensor 174, and throttle position sensor 176.

The user-interface 150 allows a user to interact with the engine control module 100, and provides the capability to establish and store a variety of parameters. The ECM 100 executes software so as to control the various parameters of the engine. The ECM 100, controls an engine in a vehicle.

Figure 2:
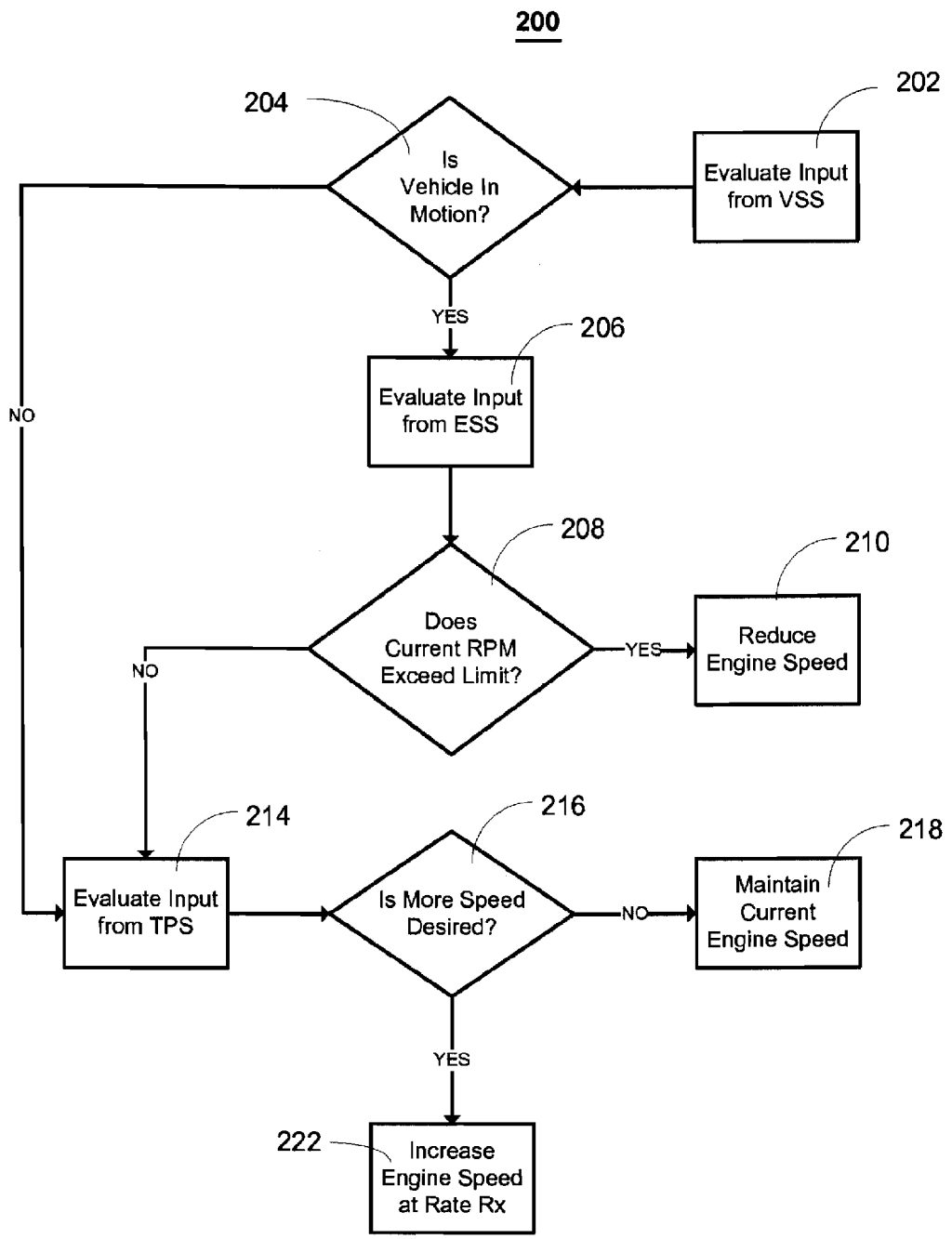
FIG. 2 shows a flowchart indicating process steps to perform a method of the present invention.

FIG. 2 shows a flowchart 200 indicating process steps to perform a method of the present invention. In process step 202, input from the vehicle speed sensor (VSS) (see reference 172 of FIG. 1) is monitored. In process step 204, the VSS input is checked to determine if the vehicle is in motion. If the vehicle is determined to be in motion, the process proceeds to step 206. In process step 206, input from the engine speed sensor (ESS) (see reference 174 of FIG. 1) is monitored. In process step 208, the ESS input is checked to determine if the engine speed currently exceeds a predetermined RPM limit. In one embodiment, the limit is a global engine RPM limit, such as a so called "red line" limit. In a four cylinder engine that might be in a small automobile, the red line limit may be in the range of 5,000 to 7,000 RPM. In the case of larger engines, the red line limit may be in the range of about 1,800 to 2,100 RPM.

If this limit is exceeded, engine speed is reduced in step 210. If the limit is not exceeded, the input from the throttle position sensor (TPS) (see reference 176 of FIG. 1) is monitored in process step 214. In process step 216, and evaluation of the TPS input is made to determine if the vehicle operator is currently demanding more engine speed (e.g. trying to accelerate by further depressing the accelerator pedal in the vehicle). If the vehicle operator is currently not demanding more power, the current engine speed is maintained in process step 218. If the vehicle operator is currently demanding more power, the engine speed is increased at predetermined rate Rx in process step 222. If the vehicle is determined to not be in motion in process step 204, the process proceeds to step 214, to evaluate input from the TPS. This process is preferably repeated frequently (e.g. every 500 milliseconds) or continuously (as quickly as possible), as to adapt quickly to changing driving conditions. This process is preferably implemented in software instructions that execute on the microprocessor 110 of FIG. 1.

The engine speed increase rate Rx referred to in process step 222 can vary, depending on factors such as vehicle type and engine type. It is contemplated that the preferred range of values for Rx is from about 60 to about 150 rpm per second, with about 90 rpm per second being the value of an exemplary embodiment on large vehicles (e.g. trucks and busses) and about 200 to about 300 rpm per second on smaller vehicles such as automobiles.

In an alternative embodiment, the engine speed increase rate is variable, depending on the driver profile. In one such embodiment, each driver is assigned an identification code that corresponds to an engine speed increase rate Rd that is assigned to that specific driver. These rates can be programmed by someone with authority to act in an administrative capacity for the vehicle. For example, in a trucking company, the fleet manager is able to establish different values of Rd for different drivers, based on factors such as experience, weather conditions, and driving record.

Figure 3:
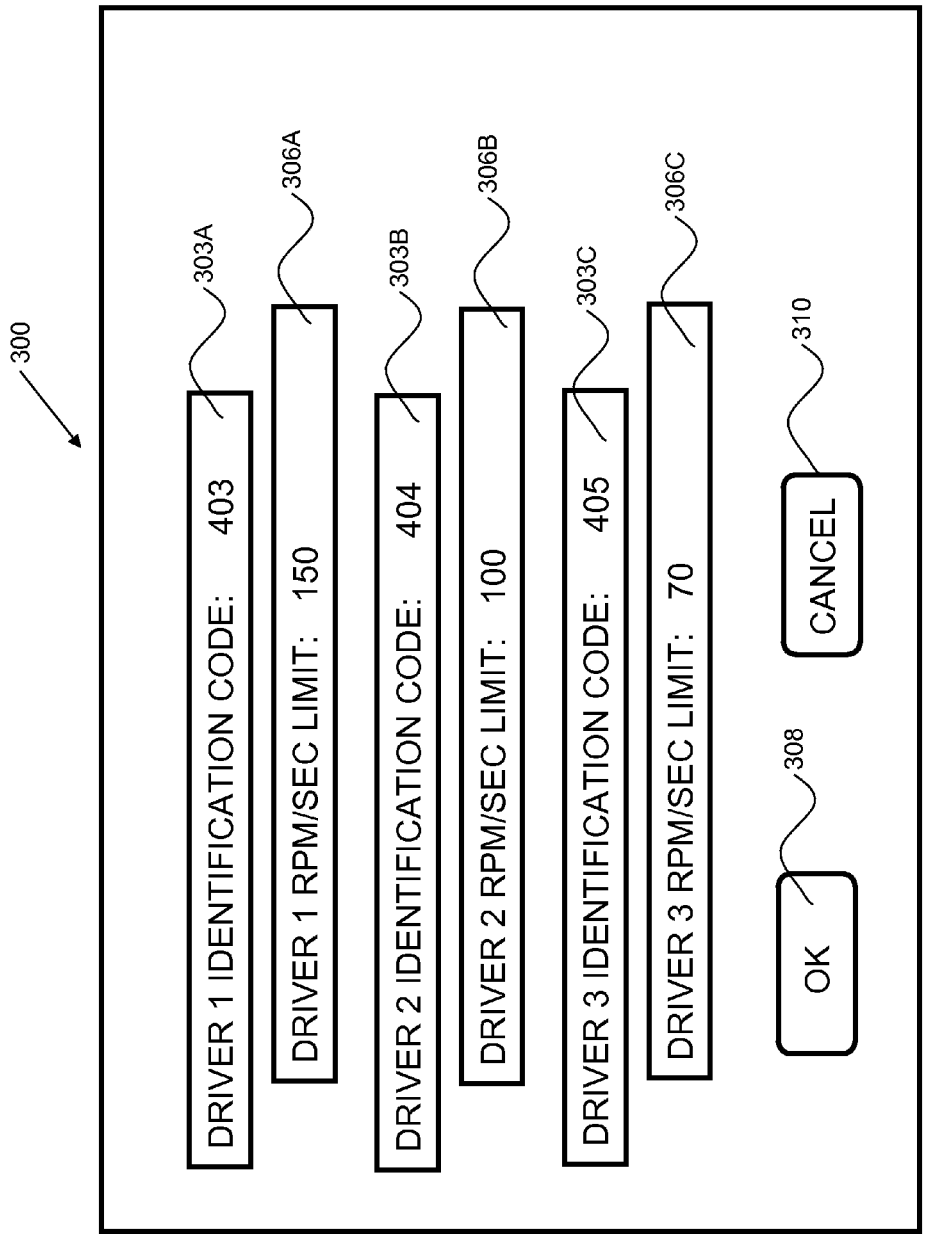
FIG. 3 shows a user interface in accordance with the present invention.

FIG. 3 shows an exemplary user interface 300 that is used to assign a specific value of Rd with a particular driver. In this example, three individual driver codes are supported, although more drivers are possible, and within the scope of the present invention. Each driver is assigned a code in fields 303A-303C. For each driver, a rate limit Rd is assigned in fields 306A-306C. For this example, driver 1 is assigned a rate of 150 rpm/second, driver 2 is assigned a rate of 100 rpm/second, and driver 3 is assigned a rate of 70 rpm/second. When the user wishes to make changes take effect, the OK button 308 is selected. To abort changes, the cancel button 310 is used.

This user interface may be implemented in a handheld computer such as an OBDC diagnostics computer that connects to the OBDC-II port of a modern vehicle. In an alternative embodiment, this user interface may be implemented via a touch-screen located within the interior of a vehicle (e.g. residing in the dashboard of the vehicle). Other implementations of the user interface are possible, such using a mobile telephone to program the parameters via a Bluetooth interface.

The driver may provide their identification in a variety of ways. In one embodiment, a keypad within the vehicle requires entry of a valid driver code prior to starting the engine. In another embodiment, an RFID tag on the driver's keychain may signal driver identification to the engine control system.

In addition to assigning a rate Rd to a specific driver, it is also contemplated to use a tiered system. In this embodiment, a plurality of user categories are defined, such as "novice", "apprentice" and "expert." In this case, drivers are assigned as members of a user category, and a rate Rd is specified for each user category. Other schemes for driver identification and assignment of rate Rd are contemplated and within the scope of the present invention.

Figure 4:
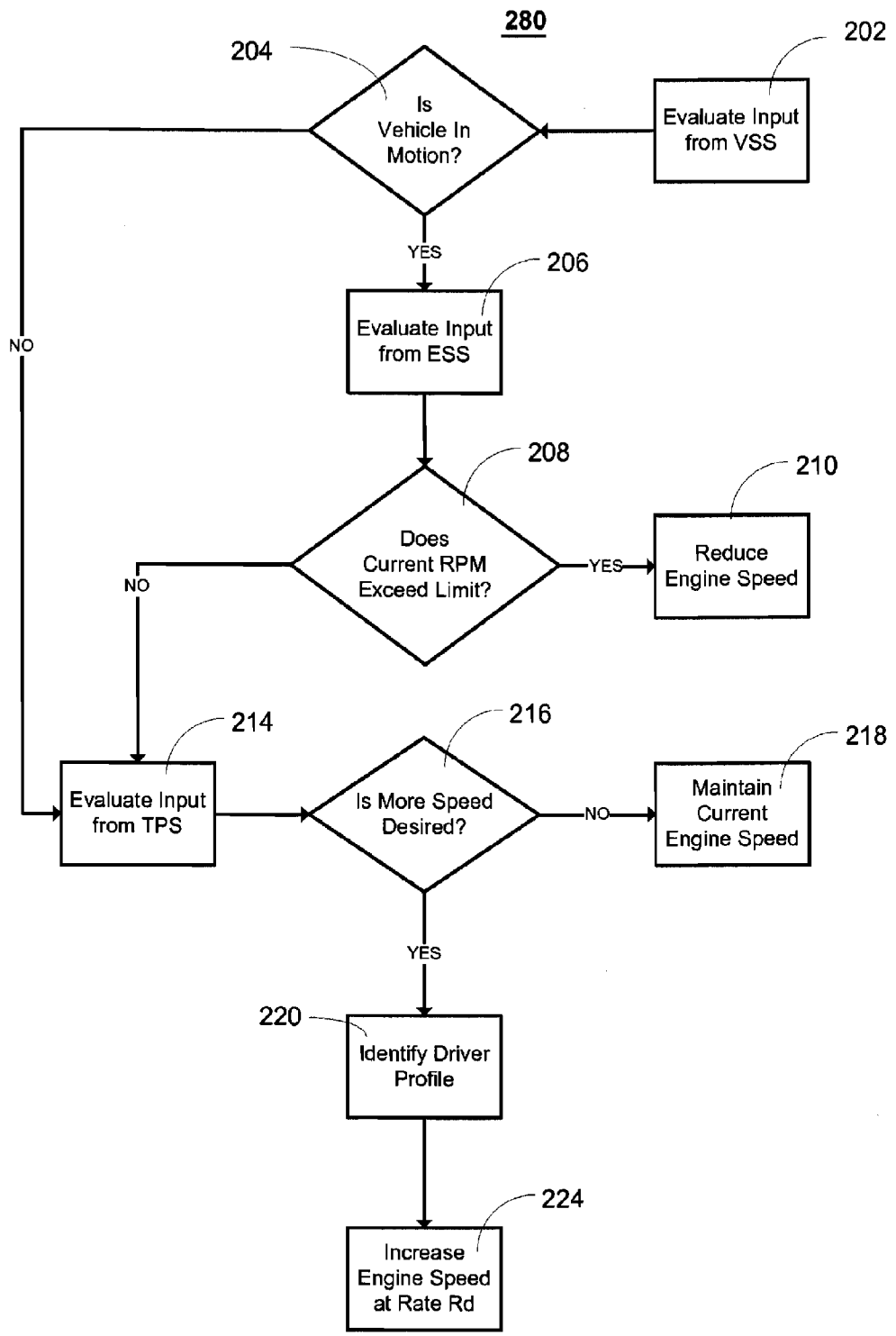
FIG. 4 shows a flowchart indicating alternative process steps to perform a method of the present invention.

FIG. 4 shows a flowchart 280 indicating alternative process steps to perform a method of the present invention. In this example, the like numbers indicate similar process steps to that of FIG. 2. For example, process step 206 of FIG. 4 is similar to step 206 of FIG. 2. In FIG. 4, process step 220 comprises identifying the driver profile, as so to ascertain the corresponding engine speed rate Rd in process step 224.

Figure 5:
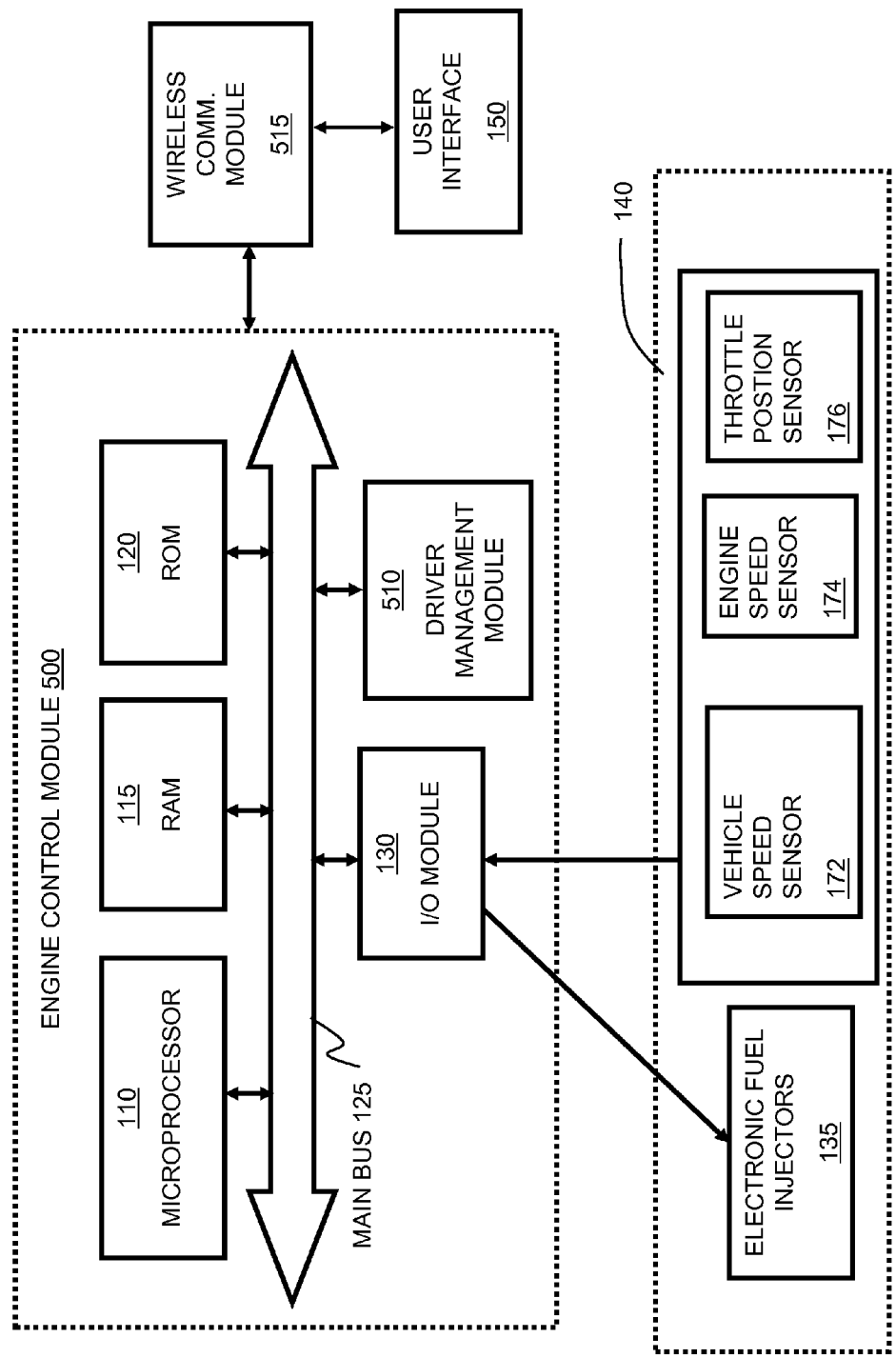
FIG. 5 shows a block diagram of an engine control system in accordance with an embodiment of the present invention.

FIG. 5 shows a block diagram of an engine control system 500 in accordance with an embodiment of the present invention. In this example, the like numbers indicate similar elements to that of FIG. 1. For example, microprocessor 110 of FIG. 5 is similar to microprocessor 110 of FIG. 1. The embodiment of FIG. 5 further comprises a driver management module (DMM) shown as reference 510. This element manages the driver information, and may be implemented via a dedicated microprocessor (and memory) that is in communication with main microprocessor 110 via bus 125. Alternatively, DMM 510 may be implemented as a software process executing directly on microprocessor 110. The DMM 510 manages the driver accounts, identification numbers, user categories, and rate limits for each user of a given vehicle. Optionally, the engine control module further comprises wireless communication module 515. Wireless communication module 515 allows a mobile device, such as a mobile telephone, laptop, or handheld computer to easily and conveniently establish the parameters that are to be managed by DMM 510. In one embodiment, wireless communication module 515 supports the Bluetooth protocol. However, other wireless communication protocols, such as ZigBee, are contemplated, without departing from the scope of the present invention.

As can now be appreciated, the present invention provides an improved method and system for controlling the ramp rate of an engine in a vehicle. The present invention has applications in both safety and fuel economy. It will be understood that the present invention may have various other embodiments. Furthermore, while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. A method for controlling the ramp rate of an internal combustion engine of a vehicle, comprising the steps of:
   identifying an operator of the vehicle;
   establishing a predetermined rate limit associated with the operator;
   determining a current engine speed;
   determining a desired engine speed; and
   increasing the current engine speed toward the desired engine speed at a rate at or below the predetermined rate limit, wherein the rate of increase of the speed of the vehicle is controlled without consideration of the gross weight of the vehicle.

2. The method of claim 1, wherein the step of establishing a predetermined rate limit comprises establishing a rate limit in the range of from about 60 rpm per second to about 300 rpm per second.

3. A method for controlling the ramp rate of an internal combustion engine of a vehicle, comprising the steps of:
   identifying one of an operator or an operator's user category;
   establishing a predetermined rate limit associated with the operator or the operator's user category;
   determining a current engine speed;
   determining a desired engine speed;
   wherein, when the current engine speed is below the desired engine speed, the engine speed is increased toward the desired engine speed at a rate at or below the predetermined rate limit, and wherein the rate of increase of the speed of the vehicle is controlled without consideration of the gross weight of the vehicle.

4. A method for controlling the ramp rate of an internal combustion engine of a vehicle, comprising the steps of:
   identifying an operator of the vehicle;
   establishing a predetermined RPM limit associated with the operator;
   monitoring input from an engine speed sensor to determine the measured RPM associated with the engine speed;
   monitoring a throttle position sensor to determine whether there is a demand for increased engine speed;
   increasing the engine speed at a rate at or below the predetermined rate limit if it is determined that there is a demand for increased engine speed; and
   wherein the adjustment of the speed is controlled without consideration of the gross weight of the vehicle.

5. A method for controlling the ramp rate of an internal combustion engine of a vehicle, comprising the steps of:
   identifying an operator of the vehicle;
   identifying a user category of which said operator is a member;
   establishing a predetermined rate limit associated with the user category;
   determining a current engine speed;
   determining a desired engine speed; and,
   increasing the current engine speed toward the desired engine speed at a rate at or below the predetermined rate limit, wherein the rate of increase of the speed of the vehicle is controlled without consideration of the gross weight of the vehicle.

6. The method of claim 5, wherein the step of establishing a predetermined rate limit comprises establishing a rate limit in the range of from about 60 rpm per second to about 300 rpm per second.

7. A method for controlling the ramp rate of an internal combustion engine of a vehicle, comprising the steps of:
   identifying an operator of the vehicle;
   identifying a user category of which said operator is a member;
   establishing a predetermined rate limit associated with the user category;
   determining a current engine speed;
   determining a desired engine speed;
   wherein, when the current engine speed is below the desired engine speed, the engine speed is increased toward the desired engine speed at a rate at or below the predetermined rate limit, and wherein the rate of increase of the speed of the vehicle is controlled without consideration of the gross weight of the vehicle.

8. A method for controlling the ramp rate of an internal combustion engine of a vehicle, comprising the steps of:
   identifying an operator of the vehicle;
   identifying a user category of which said operator is a member;
   establishing a predetermined RPM limit associated with the user category;
   monitoring input from an engine speed sensor to determine the measured RPM associated with the engine speed;
   monitoring a throttle position sensor to determine whether there is a demand for increased engine speed;
   increasing the engine speed at a rate at or below the predetermined rate limit if it is determined that there is a demand for increased engine speed; and
   wherein the adjustment of the speed is controlled without consideration of the gross weight of the vehicle.

* * * * *